United States Patent [19]

Bortolin

[11] Patent Number: 4,808,685

[45] Date of Patent: Feb. 28, 1989

[54] PROCESS FOR THE PREPARATION OF POLYSILANES

[75] Inventor: Roberto Bortolin, Brighton, United Kingdom

[73] Assignee: Dow Corning, Ltd., Barry, Wales

[21] Appl. No.: 128,231

[22] Filed: Dec. 3, 1987

[30] Foreign Application Data

Dec. 11, 1986 [GB] United Kingdom ............. 8629594

[51] Int. Cl.$^4$ .............................................. C08G 77/06
[52] U.S. Cl. ...................................... 528/14; 528/10; 556/430
[58] Field of Search ................... 528/10, 14; 556/430

[56] References Cited

U.S. PATENT DOCUMENTS

| | | | |
|---|---|---|---|
| 2,563,005 | 8/1951 | Clark | 528/43 |
| 2,606,879 | 8/1952 | Clark | 528/10 |
| 3,431,221 | 3/1969 | Hoess | 528/14 |
| 4,276,424 | 6/1981 | Peterson et al. | 556/430 |

FOREIGN PATENT DOCUMENTS 1169628 6/1984 Canada .
2077710 12/1981 United Kingdom .

OTHER PUBLICATIONS

"Silicones", Fordham, 1960, Newnes, London, pp. 23 & 24.
"Organosilicon Compounds", Eaborn, 1960, Butterworth, London, pp. 351–352.

*Primary Examiner*—John C. Bleutge
*Assistant Examiner*—Ralph Dean, Jr.
*Attorney, Agent, or Firm*—James E. Bittell

[57] ABSTRACT

A process for preparing polysilanes of the general formula $(RSi)_n$ wherein each R denotes independently an alkyl, aryl, alkaryl or aralkyl group having from 1 to 18 carbon atoms and n is at least 8, comprises reacting at least one silane of the general formula $RSiX_3$ wherein R is as defined above and X denotes a halogen atom with an alkali metal in an organic liquid medium in which the silane is soluble, preferably tetrahydrofuran.

12 Claims, No Drawings

PROCESS FOR THE PREPARATION OF POLYSILANES

The invention relates to a process for the preparation of polysilanes.

Polysilanes have been known for a long time and include different types of materials. Examples of known polysilanes are linear permethylated polysilanes, cyclic permethylated polysilanes, branched polysilanes and cage permethyl polysilanes. Polysilanes with substituents other than methyl, for example phenyl and isobutyl groups, are also known, as are polysilanes having a mixture of methyl and other substituents, for example hydrogen, halogen or phenyl substituents. Also known are polysilanes where only hydrogen atoms are found on the silicon atoms. The size of the polysilane molecules can vary widely from the disilane to polysilanes having a large number of silicon atoms attached to each other. Linear polysilanes have usually less than 10 silicon atoms in the chain, whilst cyclic and polycyclic polysilanes often have a larger number of silicon atoms.

Polysilanes can be prepared by several routes. One of the earliest published methods was that described in U.S. Pat. No. 2,380,995 in the name of Rochow, in which disilanes were produced by contacting silicon metal with an alkylhalide under specified conditions. The most common route for the production of cyclopolysilanes involves the reductive condensation of a dialkyldihalosilane with an alkali metal. This route has been described in, for example, U.S. Pat. No. 4,052,430. If an alkyltrihalosilane is included in the reaction mixture as described above co-condensation of these silanes can form cage polysilanes under certain conditions. Another route for making polysilanes starts from low molecular weight polysilane molecules which are reacted under anhydrous conditions with a Grignard reagent, as described for example in G.B. specification No. 2 081 290.

One of the more important uses of polysilanes is as precursors for silicone carbide. The polysilanes which are most preferred in this application are those which have a ratio of carbon atoms to silicon atoms which is as close as possible to 1. Hence the preparation of cage polysilanes and branched polysilanes for this purpose. G.B. specification No. 2 081 290 describes polysilanes having the average formula $[(CH_3)_2Si][CH_3Si]$ in which polysilane there are from 0 to 60 mole percent $(CH_3)_2Si=$ units and 40 to 100 mole percent $CH_3Si\equiv$ units, wherein there is also bonded to the silicon atom other silicon atoms and additional alkyl radicals of 1 to 4 carbon atoms or phenyl radicals. These are prepared by reacting polysilanes present in the direct process residue obtained during the production of chlorosilanes, with an alkyl or aryl Grignard reagent. However, the direct process residue is not pure or well defined. Making polysilanes according to the method described in G.B. No. 2 081 290 involves an extra step of purifying the direct process residue.

Patent Specification G.B No. 2 077 710 discloses and silane having an approximate composition of $-(SiH_n)-_x$ where x is large and n is from 1 to 2 comprising reacting $SiH_mX_{4-m}$, where X is fluorine, chlorine, bromine or iodine and m=1, 2 or 3, with lithium in a suspension of liquid inert to the reagents and the product and in which the polysilane is insoluble. When this reaction was repeated according to the example given in the specification, an oxygenated silicone product was obtained rather than a polysilane of the general formula $-(SiH)_x-$.

According to the present invention there is provided a process for the preparation of polysilanes of the general formula $(RSi)_n$ wherein each R is independently selected from the group consisting of alkyl, aryl, alkaryl and aralkyl groups having from 1 to 18 carbon atoms and n is at least 8, which comprises the step of reacting at least one silane of the general formula $RSiX_3$ wherein R is as defined above and X denotes a halogen atom with an alkali metal in an organic liquid medium in which the silane is soluble.

The invention provides in another aspect a polysilane of the general formula $(RSi)_n$ wherein R and n are as defined above when prepared by the process described above.

In the process of the invention at least one trihalosilane is reacted with an alkali metal in an organic liquid medium. The trihalosilanes which can be used in the process have the general formula $RSiX_3$ wherein R is an alkyl, aryl, alkaryl or aralkyl group having from 1 to 18 carbon atoms and X is a halogen atom, preferably Cl. Examples of the group R are methyl, ethyl, isobutyl, phenyl, tolyl and phenylethyl. These silanes are well known in the art and a number of them are commercially available. They may be made e.g. by direct synthesis using silicon metal and methylchloride, by the Grignard synthesis or by the addition of unsaturated alkenes or aromatic compounds to silanes having a silicon-bonded hydrogen atom. Such processes are well known and have been described in e.g. Chemistry and Technology of Silicones by W. Noll.

Examples of the trihalosilanes which may be used in the process of the invention are methyltrichlorosilane, phenyltrichlorosilane, butyltrichlorosilane and dodecyltrichlorosilane. Preferably R is the same for each silane used in the process.

The alkali metal which may be used in the process of the invention can be e.g. Na, K and Li. Li is the preferred metal as it gives the highest yield of polysilanes. The amount of alkali metal used in the reaction is at least three mole per mole of the silane utilised. In order to ensure the completion of the reaction it is preferred to add an amount slightly in excess of 3 mole of the alkali metal per mole of the silane.

The organic liquid medium in which the reaction takes place may be any solvent in which the trihalosilane reactant is soluble. Preferably the solvent used is one in which the polysilane which is produced in the process is also soluble. These solvents include hydrocarbon solvents such as toluene or paraffins, ethers and nitrogen containing solvents for example ethylenediamine, triethylamine and N,N,N',N'-tetramethylethylenediamine. Preferably tetrahydrofuran is used as the organic liquid medium. The organic liquid medium is not generally a solvent for the alkali metal halides which are formed and these can be easily removed by filtration. The amount of organic liquid medium used in the process of the invention is not critical, although the use of progressively larger amounts can result in polysilanes of progressively lower molecular weight.

The process may be carried out at any temperature but preferably the reaction temperature is maintained below 50° C. The reaction which occurs is exothermic and is preferably initiated at room temperature, no external heat being supplied during the reaction. If the temperature is increased an increase in the molecular weight of the formed polysilanes is usually observed.

This may lead to the production of polysilanes which are insoluble in the organic liquid medium.

When the reaction has proceeded to the desired degree the polysilane may be recovered from the reaction mixture by any suitable method. If the polysilane is isoluble in the liquid organic material in which the reaction took place it can be filtered out from the mixture. This is preferably done when other insolubles such as the alkali metal halides which are formed as a side product have been removed, for example by scooping or decanting. Depending on the components of the reaction the solid byproduct may float towards the surface of the mixture whilst the polysilane tends to precipitate. If the polysilane is soluble in the solvent other insolubles can be removed by filtration and the polysilane can be retained in the solvent, purified by washing or dried to a powder.

Polysilanes produced by the process of the invention are solid materials having a three dimensional structure wherein each silicon atom is linked to at least one other silicon atom and possibly to an R group. The exact structure of the polysilane has not been defined but is believed to include such structures as dodecahedron and open cage structures. In these polysilanes $(RSi)_n$ R may be an alkyl, aryl, alkaryl or aralkyl group having from 1 to 18 carbon atoms. Preferably R is $C_{1-6}$ alkyl or a phenyl group. The value of n in the general formula $(RSi)_n$ is at least 8. There is, strictly speaking, no maximum value for n but if the value is very high the polysilanes tend to become insoluble in the organic liquid medium. Preferably n has a value of from 8 to about 100 depending on the nature of R. When R denotes for example a phenyl group, the value of n is preferably from 8 to about 30 as these phenylpolysilanes are soluble in the organic liquid medium. Polysilanes obtained by the process of the invention which are soluble in hydrocarbon, ether or nitrogen containing solvents can be shaped more easily before they are formed into silicon-carbide materials and are, therefore, the most preferred.

The following examples in which parts and percentages are expressed by weight, Me denotes a methyl group, t-Bu denotes a tertiary butyl group and Ph denotes a phenyl group, illustrate the invention.

EXAMPLE 1

To a suspension of Li (2.8 g, 0.4 mole) in 100 ml of tetrahydrofuran (Thf) a solution of $PhSiCl_3$ (27.6 g, 0.13 mole) in 100 ml of Thf was slowly added. The mixture warmed up as the exothermic reaction took place and became dark brown. When all of the solution had been added the mixture was stirred for a further 3 hours at ambient temperature. The excess Li and LiCl which was formed were filtered off and the filtrate was poured into 800 ml of methanol. A precipitate formed and was filtered off, washed with water and methanol and dried under vacuum. The reaction yielded 10.58 g of a solid polysilane material. Analysis of this material showed 67.35% C and 4.71% H. The molecular weight was determined by GPC as 2276. Infrared and NMR analysis showed the presence of Ph and Si-Ph and Si-Si bonds.

EXAMPLE 2

To a suspension of Li (5.11 g, 0.73 mole) in 100 ml of tetrahydrofuran (Thf) a solution of $MeSiCl_3$ (30 g, 0.20 mole) in 100 ml of Thf was slowly added. The mixture warmed up as the exothermic reaction took place bringing the Thf to boil. The rest of the solution was added at a rate sufficient to maintain the reaction mixture at reflux. Then the mixture was stirred for a further 2 hours at ambient temperature. One liter of methanol was added to destroy the excess of Li. The solids were filtered off, washed with water and methanol and dried under vacuum. The reaction yielded 8.6 g of a solid polysilane material which was insoluble in Thf. Analysis of this material showed 26.51% C and 6.12% H.

EXAMPLE 3

To a suspension of Li (2.13 g, 0.3 mole) in 100 ml of N,N,N',N'-tetramethylenediamine (TMEDA) and cooled to $-10°$ C., a solution of $MeSiCl_3$ (14.2 g, 0.095 mole) in 50 ml of TMEDA was slowly added. The mixture was kept at $-10°$ C. by external cooling during the addition. When all of the solution had been added the mixture was stirred for a further 5 hours at $-10°$ C. followed by 3 hours at ambient temperature. The excess Li and the LiCl which was formed, were filtered off and the filtrate was poured in 1000 ml of methanol. A precipitate formed and this was filtered off, washed with water and methanol and dried under vacuum. The reaction yielded 3.21 g of a solid polysilane material. Analysis of this material showed 27.02% C and 6.25% H. The molecular weight was determined by GPC as 1548. Infrared and NMR analysis showed the presence of Me and Si-Me and Si-Si bonds.

EXAMPLE 4

To a suspension of Li (2.25 g, 0.32 mole) in 100 ml of tetrahydrofuran (Thf) a solution of $t-BuSiCl_3$ (18.62 g, 0.097 mole) in 100 ml of Thf was slowly added. The mixture warmed up as the exothermic reaction took place and became dark brown. When all of the solution had been added the mixture was stirred for a further 6 hours at ambient temperature. The excess Li and the LiCl which was formed were filtered off and the filtrate was poured into 1000 ml of methanol. A precipitate formed and this was filtered off, washed with water and methanol and dried under vacuum. The reaction yield 6.86 g of a solid polysilane material. Analysis of this material showed 54.95% C and 9.83% H. The molecular weight was determined by GPC as 5854. Infrared and NMR analysis showed the presence of t-Bu and Si-C bonds.

I claim:

1. A process for the preparation of polysilanes of the general formula $(RSi)_n$ wherein each R is independently selected from the group consisting of alkyl, aryl, alkaryl and aralkyl groups having from 1 to 18 carbon atoms and n is at least 8 which comprises the step of reacting a mixture consisting essentially of a silane or silanes of the general formula $RSiX_3$, wherein R is as defined above and X denotes a halogen atom, with an alkali metal in an organic liquid medium in which the silane or silanes are soluble.

2. A process according to claim 1 wherein the alkali metal is Li.

3. A process according to claim 1 wherein the organic liquid medium is tetrahydrofuran.

4. A process according to claim 1 wherein the organic liquid medium is one in which the polysilane is soluble.

5. A process according to claim 1 wherein each R is the same and X denotes a Cl atom.

6. A process according to claim 1 wherein the reaction is carried out below 50° C.

7. A polysilane of the general formula $(RSi)_n$ wherein R and n are as defined above which is the product of a process according to claim 1.

8. A polysilane of the general formula $(RSi)_n$ wherein R and n are as defined above which is the product of a process according to claim 2.

9. A polysilane of the general formula $(RSi)_n$ wherein R and n are as defined above which is the product of a process according to claim 3.

10. A polysilane of the general formula $(RSi)_n$ wherein R and n are as defined above which is the product of a process according to claim 4.

11. A polysilane of the general formula $(RSi)_n$ wherein R and n are as defined above which is the product of a process according to claim 5.

12. A polysilane of the general formula $(RSi)_n$ wherein R and n are as defined above which is the product of a process according to claim 6.

* * * * *